United States Patent

Shimizu et al.

[11] Patent Number: 4,816,308
[45] Date of Patent: Mar. 28, 1989

[54] MULTILAYERED CONTAINER

[75] Inventors: Senzo Shimizu, Odawara; Yoshiaki Momose, Hadano; Yozo Yoshida, Hiratsuka, all of Japan

[73] Assignee: Mitsubishi Gas Chemical Company, Inc., Tokyo, Japan

[21] Appl. No.: 135,304

[22] Filed: Dec. 21, 1987

[30] Foreign Application Priority Data

Dec. 27, 1986 [JP] Japan ............................ 61-309146

[51] Int. Cl.⁴ .................... B65D 23/00; B32B 27/36
[52] U.S. Cl. ............................... 428/36.7; 215/1 C; 428/475.2; 428/483; 428/335; 428/336
[58] Field of Search ............... 428/35, 475.2, 483, 428/516, 518, 520, 335, 336; 215/1 C

[56] References Cited

U.S. PATENT DOCUMENTS

| 4,528,219 | 7/1985 | Yamada et al. | 428/35 |
| 4,535,901 | 8/1985 | Okudaira et al. | 428/35 |
| 4,535,901 | 8/1985 | Okudaira | 215/1 C |
| 4,564,541 | 1/1986 | Taira et al. | 428/35 |
| 4,728,549 | 3/1988 | Shimizu et al. | 428/35 |
| 4,741,936 | 5/1988 | Nohara et al. | 428/35 |

FOREIGN PATENT DOCUMENTS 2006108A 5/1979 United Kingdom .

*Primary Examiner*—Ellis P. Robinson
*Assistant Examiner*—James J. Seidleck
*Attorney, Agent, or Firm*—Wenderoth, Lind & Ponack

[57] ABSTRACT

A biaxially oriented multilayered container consisting of a body portion and a mouth portion. The body portion comprises one or more layers of a thermoplastic gas-barrier resin B and layers of a thermoplastic resin A other than the resin B which are larger in number than the resin B layers by 1, the resin A and B layers being laminated alternately, and at least the open end part of said mouth portion is composed of a single layer of the resin A. As a characteristic feature, a coarsely mixed resin layer of resins A and B in which the proportion of resin particles having a long diameter of not more than 10 μm is not more than 10% exists in at least one of the boundaries between the resin A and B layers.

9 Claims, 1 Drawing Sheet

MULTILAYERED CONTAINER

BACKGROUND OF THE INVENTION

This invention relates to a multilayered container, and more specifically, to a multilayered container having excellent delamination resistance, transparency, gas-barrier property and mechanical strength.

In recent years, hollow containers produced from thermoplastic resins have found widespread use as containers for cosmetics, foods, beverages, etc. because of their various advantages such as light weight and safety against bursting. Pariticularly, hollow containers of polyethylene terephthalate have been rapidly developed as a result of advances in the biaxial stretch-below molding techniques.

Biaxially oriented containers of thermoplastic polyester resins, mainly polyethylene terephthalate, do not necessarily have perfect properties for packaging purposes. When, for example, foods and beverages which require a high level of gas barrier property are held in such containers, the flavor of the contents will be spoiled because these resins do not possess sufficient oxygen and carbon dioxide gas barrier properties.

In an attempt to remove this defect, there was proposed a multilayered container obtained by injection-molding a thermoplastic polyester resin and then a m-xylylene group-containing polyamide resin (to be abbreviated as MX nylon) as a thermoplastic gas-barrier resin from separate injection cylinders into a single mold to form a three-layerd parison composed of an inside layer of the thermoplastic polyester resin and an outside layer of the thermoplastic polyester resin and a core layer of the MX nylon, and biaxially stretch-below molding the parison (Japanese Laid-Open Patent Publications Nos. 128516/1982 and 128520/1982; and the corresponding U.S. Pat. No. 4,535,901). If in this method, the amount of the MX nylon to be injected is decreased in an attempt to reduce the thickness of the core layer, the core layer is formed only partly, and the resulting container has insufficient gas-barrier property.

The present inventors invented a method improved over the above method, in which a thermoplastic polyester resin, MX nylon and the thermoplastic polyester resin are injected sequentially in this order to form a five-layered structure with three layers of the thermoplastic polyester resin and two layers of MX nylon being laminated alternatively, and as a result, in spite of the two layers of MX nylon, the amount of MX nylon injected can be decreased from that in the prior art (Japanese Laid-Open Patent Publication No. 240409/11980 and corresponding U.S. patent application Ser. No. 87969 and European Patent Publication No. 161625; Japanese Laid-Open Patent Publication No. 108542/1986 and corresponding U.S. patent application Ser. No. 793095 and European Patent Publication No. 180,191).

There was also proposed a method in which a resin forming an inside and an outside layer is first injected, and then a resin A forming an inside layer and an outside layer and a resin forming a core layer are simultaneously injected thereby reducing the thickness of the core layer (Japanese Patent Publication No. 16326/1985 and corresponding U.S. Pat. No. 4,174,413). This method can be applied when the core layer is made of a thermoplastic gas-barrier resin, but gives a three-layered structure in which the core layer is deviated toward one side from the center.

SUMMARY OF THE INVENTION

However, since thermoplastic gas-barrier resins (to be referred to as resins B) including MX nylon generally have poor affinity for thermoplastic polyester resins, etc. other than the resin B (to be referred to as resins A), multilayered-containers obtained by the above prior methods have low delamination resistance, and delamination tends to occur when deforming forces and impact forces are externally exerted on the containers or the internal pressure of a filled carbon dioxide-containing liquid is exerted. A container which has undergone delamination looks somewhat whitish and is not desirable in appearance because the delaminated portion separates into two layers.

The present inventors studied the feasibility of making the core layer from a mixture of resin B and resin A or forming a layer of the mixture of resins B and A between the core layer and each of the inside and outside layer. It was found that when the proportion of the resin B in the mixed resin was increased, the resulting container become hazy with a milk white or pearl-like color, and its delamination resistance was improved; and that when the proportion of resin A was increased, the delamination resistance of the container was improved, but the occurrence of a milk white or pearl-like haze, which is the general defect of mixed resins, could not be avoided.

On further extensive investigations, the present inventors have found that the above defect associated with the use of mixed resins is attributed to the mixed state of the resins, and can be eliminated by using a mixed resin layer with a specific mixed state.

It is an object of this invention therefore to provide a multilayered container free from delamination between resin layers.

Another object of this invention is to provide a multi-layered container having excellent gas-barrier properties and mechanical strength and being free from delamination.

Still another object of this invention is to provide a multilayered container having excellent gas-barrier properties and mechanical strength and being free from delamination and occurrence of haze.

A further object of this invention is to provide a multilayered container which does not undergo delamination between resin layers even when used for a long period of time as a beverage container requiring oxygen and carbon dioxide gas barrier properties.

The objects of this invention are achieved by a biaxially oriented multilayered container composed of a body portion and a mouth portion, said body portion comprising one or more layers of a thermoplastic gas-barrier resin (resin B) and layers of a thermoplastic resin (resin A) other than the resin B, the number of the resin A layers being larger than that of the resin B layers by one, said resin A and resin B layers being laminated alternately, and at least the open end part of said mouth portion being composed of a single layer of the resin A; wherein a coarsely mixed resin layer composed of resins A and B in which the proportion of resin particles having a long diameter of not more than 10 $\mu$m is not more than 10% exists in at least one of the boundaries between the resin A and B layers.

BRIEF DESCRIPTION OF THE DRAWING

The invention will now be described in detail with reference to the accompanying drawings, in which.

DETAILED DESCRIPTION OF THE PREFERRED EMBODIMENTS

The present inventors discovered that in the biaxial stretch-blow molding of a parison having a layer of a mixture of two resins, the state of the two resins being not fully mixed (to be referred to as the "coarsely mixed state") leads to a container having less haze and higher delamination resistance, and continued their investigations. These investigations have led to the discovery that when two resins are melt-mixed by using an ordinary screw, the resin used in a smaller amount is generally present in island-like dots in the resin used in a larger amount, and after stretching to 5 to 15 times, the islands have a long diameter of not more than 10 μm and become a cause of haze; but that in the coarsely mixed state, there are hardly any resin islands having a long diameter of not more than 10 μm and the haze is much reduced. The present inventors have specifically found that to reduce the haze of containers to not more than 15% as is generally required, the proportion of resin particles having a long diameter of not more than 10 μm should be not more than 10%, preferably not more than 5%, and especially preferably not more than 3%.

In a complete resin mixture in which resin particles in a smaller amount exist as islands in a matrix of a resin in a larger amount, the island-like resin particles are not necessarily spherical but have an elongated spherical shape or the like. This tendency is greater as the size of the particles become larger. As a result of stretching of the mixed resin layer, such resin particles further change in shape, and become disc-like or elliptical plate-like. In the coarsely mixed state, as referred to in the present invention, the shape of the resin particles is irregular. Thus, in the present invention, the long diameter of a resin particle denotes the maximum diameter of the resin particle viewed in a cross-section parallel to the plane of the stretched thin mixed resin layer.

The increase of delamination resistance in the coarsely mixed state is presumably because the resins are not separated into a matrix and islands and the individual resins occupy surface areas corresponding to their mixing ratio. In contrast, in an ordinary mixed state, a resin in a larger amount covers the surrounding of a resin in a smaller amount, and when a layer adjoining the mixed layer is composed of the resin used in a smaller amount in the mixed layer, the adhesion strength between these layers does not increase.

To obtain the coarsely mixed state, it is important to intermix the two resins without kneading. This can be achieved, for example, by mixing them with a static mixer, or by mixing them in the absence of a lubricant such as stearic acid or stearic acid salts by using a cylinder with a screw having a low keading effect. Examples of apparatus that can be used in this invention will be described below.

Figure 1:
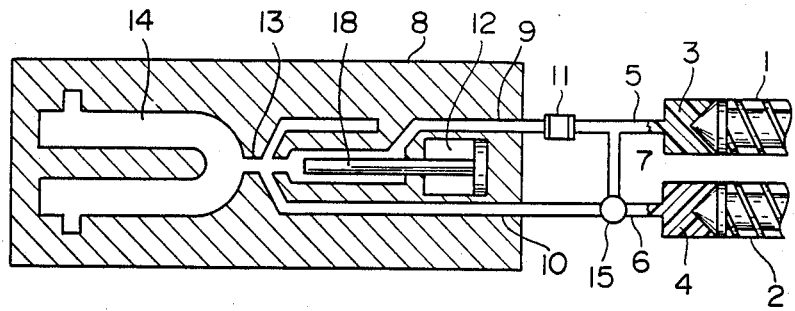
FIGS. 1 and 2 are schematic views showing examples of apparatus for forming a parison which is a preform of the multilayered container of the invention.

FIG. 1 is a schematic view showing one example of a molding apparatus for formation of a parison used to make the multilayered container of this invention.

This apparatus includes a cylinder 2 for a resin A and a cylinder 1 for a resin B, and means for simultaneously or alternately injecting the resins A and B melted in the cylinders 2 and 1 into a cavity 14 in a mold 8 via a gate 13. It also has a switch valve 15, a linking pipe 7 and a static mixer 11.

When in this apparatus, the switch valve 14 permits linking of a nozzle 6 for the resin A to a flow passage 10 for the resin A within the mold, the resin A 4 and the resin B 3 can be injected into the cavity via the flow passage 10 and a flow passage 9 for the resin B respectively as in a conventional method. When the switch valve 15 is operated to permit communication of the nozzle 4 for the resin A with the linking pipe 7 and an injecting pressure is applied simultaneously to the cylinder 2 and the cylinder 1, the molten resin A 4 advancing through the nozzle 6 and the linking pipe 7 and the molten resin B 3 advancing through the nozzle 5 are coarsely mixed in the static mixer 11. Thereafter, the mixture can be injected into the cavity 14 via the flow passage 9 and the gate 13.

Figure 3:
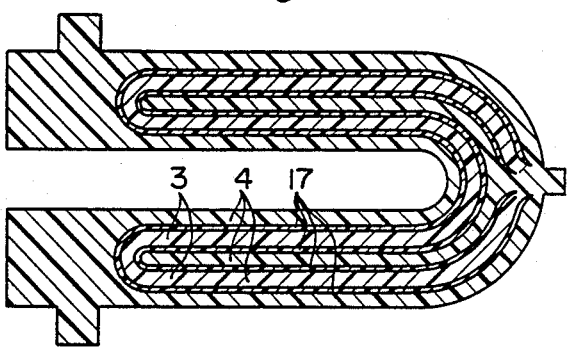
FIGS. 3 and 4 are sectional views of such parisons.

When the resin A, the coarsely mixed resin, the resin B, the coarsely mixed resin and the resin A are injected in this sequence by using the apparatus of FIG. 1, a parison of a 9-layered structure shown in FIG. 3 in its section can be obtained.

Figure 2:
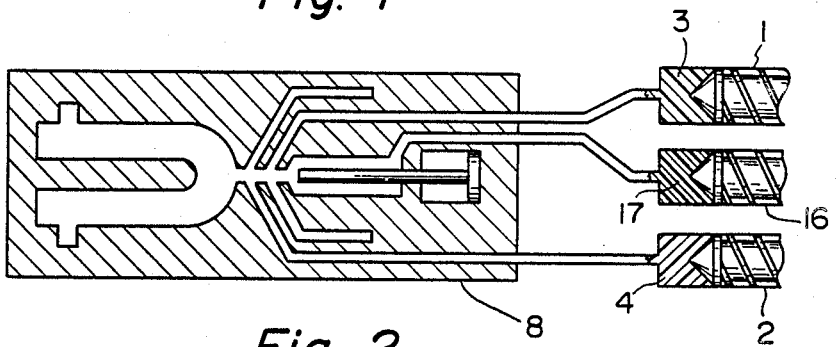

FIG. 2 is a schematic view showing an example of another injection-molding apparatus.

Figure 4:
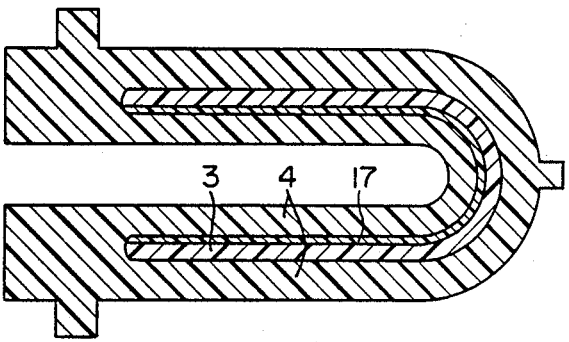

The apparatus shown in FIG. 2 includes a cylinder 2 for resin A, a cylinder 1 for resin B, and a cylinder 16 for producing a coarsely mixed resin and injecing it. When resin A 4 is injected, and thereafter, resin A 4, resin B 3 and a mixed resin 17 are simultaneously injected by using this apparatus, a parison of a 4-layered structure as shown in FIG. 4 in tis section can be obtained.

The weight ratio of the resin A and the resin B in the coarsely mixed resin layer may be varied widely, but for the purpose of adhesion of the resin A layer and the resin B layer, may suitably be from 2:8 to 8:2. The thickness of the coarsely mixed resin layer may be varied widely, but is suitably 5 to 100 μm.

Examples of the resin A used in this invention are thermoplastic polyester resins, polyolefin resins, polycarbonate, polyacrylonitrile, polyvinyl chloride and polystyrene. The thermoplastic polyester resins are preferred.

Examples of the resin B which is a thermoplastic gas-barrier resin are MX nylon, a saponified ethylene/vinyl acetate copolymer resin, polyacrylonitrile copolymer resins and polyvinylidene chloride resin. MX nylon is preferred.

A combination of a thermoplastic polyester resin, especially polyethylene terephthalate, and MX nylon is most preferred because this combination has excellent transparency, mechanical strength, injection-moldability and stretch-blow moldability.

The thermoplastic polyester resin usually denotes a polyester composed of an acid component at least 80 mole%, preferably at least 90 mole%, of which consists of terephthalic acid and a glycol component at least 80 mole%, preferably at least 90 mole%, of which consists of ethylene glycol. Examples of the other acid component are isophthalic acid, diphenyl ether-4,4-dicarboxylic acid, naphthalene-1,4 or 2,6-dicarboxylic acid, adipic acid, sebacic acid, decane-1,10-dicarboxylic acid, and hexahydroterephthalic acid, and examples of the other glycol component include propylene glycol, 1,4- butanediol, neopentyl glycol, diethylene glycol, cyclohexanedimethanol, 2,2-bis(4-hydroxyphenyl)propane and 2,2-bis(4-hydroxyethoxyphenyl)propane. Polyester resins containing a hydroxycarboxylic acid such as p-hydroxybenzoic acid may also be cited as examples.

These thermoplastic polyester resins suitably have an inherent viscosity of at least 0.55, preferably 0.65 to 1.4. If their inherent viscosity is less than 0.55, it is difficult to obtain a transparent amorphous multilayered parison, and a container made from it has insufficient mechanical strength.

The MX nylon denotes a polymer containing at least 70 mole% of structural units obtained from m-xylylenediamine alone or mixed xylylenediamine containing m-xylylenediamine and not more than 30%, based on the total amount, of p-xylylenediamine, and an alpha, omega-aliphatic dicarboxylic acid having 6 to 10 carbon atoms.

Examples of the MX nylon include homopolymers such as poly-m-xylene adipamide, poly-m-xylene sebacamide and poly-m-xylene suberamide; copolymers such as m-xylylene/p-xylylene adipamide copolymer, m-xylylene/p-xylylene pimelamide copolymer and m-xylylene/p-xylylene azelamide copolymer; and copolymers obtained by copolymerizing the components of these homo- or co-polymers with aliphatic diamines such as hexamethylenediamine, alicyclic diamines such as piperazine, aromatic diamines such as p-bis-(2-aminoethyl)benzene, aromatic dicarboxylic acids such as terephthalic acid, lactams such as epsilon-caprolactam, omega-aminocarboxylic acids such as omega-aminoheptanoic acid, and aromatic aminocarboxylic acids such as p-aminobenzoic acid.

Nylon 6, nylon 66, nylon 610 and nylon 11 may also be included within the examples of these polymers.

The suitable relative viscosities of these MX nylons are at least 1.5, preferably 2.0 to 4.0.

As required, a coloring agent, an ultraviolet absorber, an antistatic agent, an antioxidant, a lubricant, a nucleating agent, etc. may be incorporated in one or both of the resins A and B in amounts which do not impair the objects of this invention.

The multilayered container of this invention can be produced by biaxially stretching the parison at a temperature of 70° to 130° C. to 1 to 4 times in the axial direction and 2 to 7 times in the circumferential direction at an area stretch ratio of 5 to 15. As with known multilayered containers, at least the non-stretched part of the opening end portion of its mouth portion should be formed of a single layer of the resin A because the gas-barrier resin B in the non-stretched state is whitened upon moisture absorption, or decreases in gas-barrier property.

The amount of the resin B in the entire container may be selected from the range of 1 to 50% by volume. Since the gas-barrier resin generally has inferior mechanical properties and transparency, its amount is preferably as small as possible within the above range so long as the required gas-barrier property can be obtained. The preferred amount is 1 to 20% by volume. There is no particular restriction on the number of layers composed of the resin B. From the standpoint of productivity, it is suitably 1 to 3.

The body portion of the multilayered container has a thickness of 150 to 2,000 $\mu$m, preferably 200 to 1,500 $\mu$m.

By interposing the coarsely mixed resin layer in a specific state between the resin A layer and the resin B layer, the present invention provides a multilayered container having excellent delamination resistance and low haze.

The relation between the structure of the multilayered container and its advantages is not entirely clear. However, the multilayered container of this invention has excellent delamination resistance, transparency, gas-barrier property and mechanical strength, and its industrial significance is great.

The following examples illustrate the present invention in greater detail.

The various properties of the resins and the containers in the following examples were measured by the following methods.

(1) Inherent viscosity [$\eta$] of a polyester resin

Measured at 30° C. using a mixture of phenol and tetrachloroethane (6:4 by weight).

(2) Relative viscosity of [$\eta_{rel}$] of a polyamide resin

Measured at 25° C. using a solution of 1 g of the resin in 100 ml of 96% sulfuric acid.

(3) Haze

The haze is defined as [diffusion transmittance (quantity of light)/total transmittance (quantity of light)]×100 in accordance with ASTM D1003-01, and measured by a digital hazeometer (Model NDH-2D) made by Nippon Denshoku Kogyo Co., Ltd.

(4) Delamination resistance

Peeling direction: 180°
Peeling speed: 300 mm/min.
Sample size: 25 mm in width and 170 mm in length (5) Oxygen permeability Measured at a relative humidity of 100% inside and 65% outside at 20° C. using OXTRAN100 made by Modern Control Company.

(6) Proportion of particles having a long diameter of not more than 10 $\mu$m in the mixed rein layer The mixed resin layer was treated with a dye (Kayanol Red NB No. Q 02705, a tradename for a product of Nippon Kayaku Co., Ltd.) capable of dyeing only poly-m-xylene adipamide. The long diameters of the dyed poly-m-xylene adipamide particles and the non-dyed polyester resin particles and the total area of these particles were measured under a microscope. The proportion of the total area of those poly-m-xylene adipamide resin particles and polyester resin particles which had a long diameter of not more than 10 $\mu$m was expressed in percentage based on the total area of the entire measured resin particles.

EXAMPLES 1-2

In each run, polyethylene terephthalate (PET for short) having an inherent viscosity of 0.75 as resin A and poly-m-xylene adipamide (N-MXD6 for short) having a relative viscosity of 2.1 as resin B were used and a parison was formed by the apparatus shown in FIG. 2.

A cylinder with a screw having inferior kneading effect to a screw of an ordinary shape was used as cylinder 16 for the coarsely mixed resin. Calcium stearate was added in an amount of 0.1% by weight based on the total amount of the resins. The mixing weight ratio of PET to N-MXD6 was set at 7:3 (Example 1) or 3:7 (Example 2).

First, the resin A alone was injected, and then the resin A, the resin B and the coarse mixture of the resins A and B were simultaneously injected. Finally, the resin A alone was injected. The amounts of the resins injected based on the volume of the mold cavity were as follows:

| Resin A initially injected | 35.0% |
|---|---|
| Resin A simultaneously injected | 17.5% |
| Resin B simultaneously injected: | 5.0% |
| Coarse resin mixture simultaneously injected: | 2.5% |
| Resin A finally injected: | 40.0% |

The temperature conditions during injection were as follows:

| Cylinder for injecting resin A: | 270° C. |
|---|---|
| Cylinder for injecting resin B: | 260° C. |
| Cylinder for injecting the coarse resin mixture: | 270° C. |
| Resin flow passage in the mold: | 270° C. |
| Cooling water for the mold: | 15° C. |

There was obtained a parison weighing about 59 g having a four-layered body portion with a thickness of about 4.5 mm. Its structure was as shown in FIG. 4.

Using a biaxially stretch-blow molding machine, the parison was heated with a quartz heater until the surface temperature of the parison reached 95° C., transferred to a blow mold, and biaxially stretched and blow-molded at a stretching rod moving speed of 20 cm/sec under a stretch blow pressure of 20 kg/cm$^2$, a bottle-like hollow multilayered container was obtained which has a total length of 300 mm, an outside diameter of 90 mm, an inner capacity of 1500 ml and a body portion thickness of 400 μm. The ratio of the thicknesses of the inside PET layer:coarsely mixed resin layer:N-MXD6 layer:outside PET layer in the body portion was 5.5:1:1.5:2.

The oxygen permeability of the multilayered container was measured. Test samples were cut out from its body portion, and the proportion of resin particles having a long diameter of not more than 10 μm in the coarsely mixed resin layer, and the haze and delamination resistance of the samples were measured. The results are shown in Table 1.

COMPARATIVE EXAMPLES 1-2

For comparison, Examples 1 and 2 were repeated except that a cylinder with a screw having a better kneading effect than that used in the cylinder for injecting the coarsely mixed resin in Examples 1 and 2 was used for injecting the coarsely mixed resin, and that no calcium stearate was used. The results are shown in Table 1.

COMPARATIVE EXAMPLES 3-4

Examples 1 and 2 were repeated except that the amount of calcium stearate in the cylinder for injecting the coarsely mixed resin was decreased to 0.01% by weight to increase the kneading effect slightly. The results are shown in Table 1.

COMPARATIVE EXAMPLE 5

For comparison, no coarsely mixed resin was used. Specifically, PET alone was first injected, and then PET and N-MXD6 were simultaneously injected. Finally, PET alone was injected to produce a parison having a three-layered body portion composed of two layers of PET and one layer of N-MXD6. In the same way as in Example 1, a multilayered container in which the thickness ratio of the inside PET layer:N-MXD6 layer:outside PET layer in the three-layer body portion was 6:2:2 was produced from the parison.

The resulting multlayered container was tested as in Example 1, and the results are shown in Table 1.

TABLE 1

| Run (*) | Haze (%) | Delamination resistance (kg/m) () | Oxygen permeability (cc/pack day) | Mixed state (%) (*) |
|---|---|---|---|---|
| Ex. 1 | 3.9 | 20.6 | 0.0178 | 1 |
| Ex. 2 | 4.4 | 14.3 | 0.0131 | 1 |
| CEx. 1 | 26.9 | 5.2 | 0.0204 | 98 |
| CEx. 2 | 28.7 | 3.9 | 0.0143 | 98 |
| CEx. 3 | 7.2 | 6.2 | 0.0221 | 15 |
| CEx. 4 | 17.4 | 7.6 | 0.0193 | 18 |
| CEx. 5 | 3.0 | 4.0 | 0.0155 | — |

(*) Ex. = Example; CEx. = Comparative Example
(**) Delamination resistance between the resin A layer and the resin B layer positioned with the mixed resin layer between them.
(***) The mixed state is expressed by the proportion of resin particles having a long diameter of not more than 10 μm in the mixed resin layer.

What we claimed is:

1. A biaxially oriented multilayered container consisting of a body portion and a mouth portion, said body portion comprising one or more layers of a thermoplastic gas-barrier resin (resin B) and layers of a thermoplastic resin (resin A) other than the resin B, the number of the resin A layers being larger than that of the resin B layers by one, said resin A and B layers being laminated alternately, and at least the open end part of said mouth portion being composed of a single layer of the resin A; wherein a coarsely mixed resin layer of resins A and B in which the proportion of resin particles having a long diameter of not more than 10 μm is not more than 10% exists in at least one of the boundaries between the resin A and B layers.

2. The multilayered container of claim 1 wherein the body portion is composed of 1 to 3 layers of the resin B, 2 to 4 layers of the resin A, and the coarsely mixed resin layer of the resins A and B existing in at least one of the boundaries between the resin A and B layers.

3. The multilayered container of claim 1 wherein the body portion is composed of 3 layers of the resin A, 2 layers of the resin B, and the coarsely mixed resin layer of the resins A and B existing in at least one of the boundaries between the resin A and B layers.

4. The multilayered container of claim 1 wherein the body portion is composed of 2 layers of the resin A, 1 layer of the resin B, and the coarsely mixed resin layer of the resins A and B existing in at least one of the boundaries between the resin A and B layers.

5. The multilayered container of claim 1 wherein the resin A is a thermoplastic polyester resin and the resin B is a polyamide resin containing a m-xylylene group.

6. The multilayered container of claim 1 wherein in said coarsely mixed resin layer, the weight ratio of the resin A to the resin B is from 8:2 to 2:8.

7. The multilayered container of claim 1 wherein said coarsely mixed resin layer has a thickness of 5 to 100 μm.

8. The multilayered container of claim 1 wherein the body portion has a thickness of 150 to 2,000 μm.

9. The multilayered container of claim 1 wherein the amount of the resin B used is 1 to 50% by volume based on the total volume of the resins constituting the container.

* * * * *